(12) United States Patent
Audityan et al.

(10) Patent No.: US 6,256,713 B1
(45) Date of Patent: Jul. 3, 2001

(54) BUS OPTIMIZATION WITH READ/WRITE COHERENCE INCLUDING ORDERING RESPONSIVE TO COLLISIONS

(75) Inventors: Srinath Audityan, Austin; James Nolan Hardage, Jr., Kyle; Thomas Albert Petersen, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/303,365

(22) Filed: Apr. 29, 1999

(51) Int. Cl.[7] .................................................... G06F 12/00
(52) U.S. Cl. ............................................................. 711/141
(58) Field of Search ................................. 711/3, 141, 144, 711/145, 158; 710/112

(56) References Cited

U.S. PATENT DOCUMENTS

| | | | |
|---|---|---|---|
| 5,530,933 | * 6/1996 | Frink et al. | 711/141 |
| 5,822,772 | * 10/1998 | Chan et al. | 711/158 |
| 5,978,886 | * 11/1999 | Moncton et al. | 711/118 |
| 6,038,646 | * 3/2000 | Sproull | 711/158 |

OTHER PUBLICATIONS

Messmer, Hans–Peter. *The Indispensable P.C. Hardware Book: Your Hardware Questions Answered.* (Second Edition) Addison–Wesley. New York, 1995, pp. 211–226.
Kozierok, Charles M. "Function and Operation of the System Cache," *P.C. Guide.* http://www.pcguide.com/ref/mbsys/cache/func–c.html, Dec. 16, 1998 vers., pp. 1–8.
Kozierok, Charles M. "Layers of Cache," *P.C. Guide.* http://www.pcguide.com/ref/mbsys/cache/layers–c.html, Dec. 16, 1998 vers., pp. 1–3.

* cited by examiner

*Primary Examiner*—Kevin Verbrugge
(74) *Attorney, Agent, or Firm*—Anthony V. S. England; Robert M. Carwell

(57) ABSTRACT

The present invention provides a method and apparatus for optimizing bus utilization while maintaining read and write coherence. More specifically the invention provides bus utilization optimization by prioritizing read transactions before write transactions, where there is no collision pending. When a collision pending is determined, then the read and write transactions are processed according to the age of the transaction(s) allowing for data coherency.

14 Claims, 6 Drawing Sheets

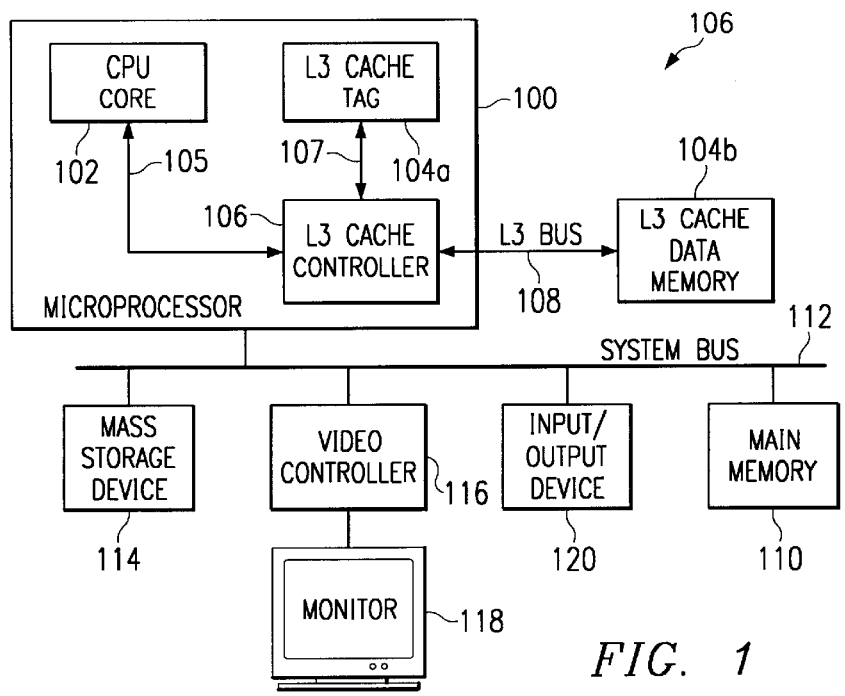
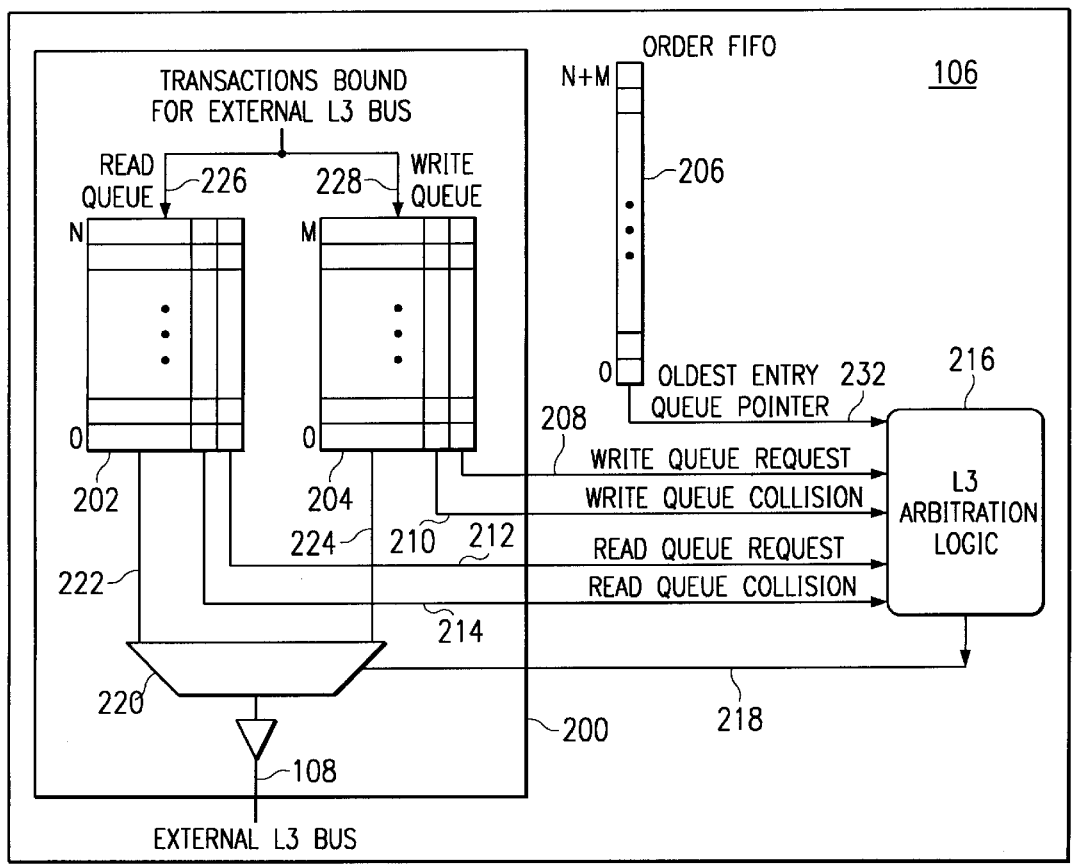

US 6,256,713 B1

BUS OPTIMIZATION WITH READ/WRITE COHERENCE INCLUDING ORDERING RESPONSIVE TO COLLISIONS

FIELD OF THE INVENTION

The disclosed invention relates to optimizing bus utilization while maintaining read/write coherence. Bus optimization is achieved by prioritization of read transactions over write transactions, where as many reads as possible occur contiguously.

BACKGROUND

As technology in the computer industry advances, the speed at which information is processed and accessed is increased. Certain instructions only require internal action by the processor, the processor speed controls the speed of a computer system in these situations. However, other instructions initiated by the processor require external transactions which are paced by the speed at which peripheral devices interact with the processor. Thus, optimization can be obtained by processing the transactions prior to presenting the transaction on the bus interface which requires a peripheral device to process the transactions. However, a difficulty can occur with data coherence. If data to a particular location is continuously updated and read, then the transactions to and from this location must be processed in the order in which the processor generated the transactions. Thus, when dealing with cache memory, a write request to a specific location in cache memory must be completed prior to a later request to read from that same location in memory. And conversely, a read request to a specific location in cache memory must be completed prior to a later request to write to the same location in memory.

The prior art includes at least two schemes. One scheme allows for complete in-order processing of transactions. An in-order implementation requires that a processor's read or write transactions be performed in the order in which the processor requests each transaction. This process ensures read/write coherence, but does nothing to optimize the bus utilization.

Another prior art scheme allows for out of order processing of transactions such that the read and write transactions to the cache memory can be prioritized to optimize the bus utilization. If a read transaction collides with a resident write transaction, the read data is forwarded from the write queue entry. This allows a read transaction to be performed without dependence upon the completion of a write transaction. However, this requires an undesirable increase in hardware and complexity on the processor chip or chip set.

Any advancement in the ability to optimize bus utilization while maintaining read/write coherence would be beneficial. Therefore, it is an objective in this invention to provide an increased bus utilization while maintaining read/write coherence.

THE SUMMARY OF THE INVENTION

The present invention provides a method and apparatus for optimizing bus utilization while maintaining read and write coherence. More specifically, the invention provides bus utilization optimization by allowing an optimal prioritization mechanism when there is no collision pending. When a collision pending is determined, then the read and write transactions are processed according to age of the transactions allowing for data coherency.

BRIEF DESCRIPTION OF DRAWINGS

A better understanding of the present invention can be obtained when the following detailed descriptions of the exemplary embodiment are considered in conjunction with the following drawings in which FIG. 1 is a block diagram of the computer system in accordance with the disclosed inventions;

FIG. 2 is a block diagram of queuing and control for the L3 cache external bus in accordance with the disclosed invention;

DETAILED DESCRIPTION OF ENCLOSED EMBODIMENTS

Figure 3A:
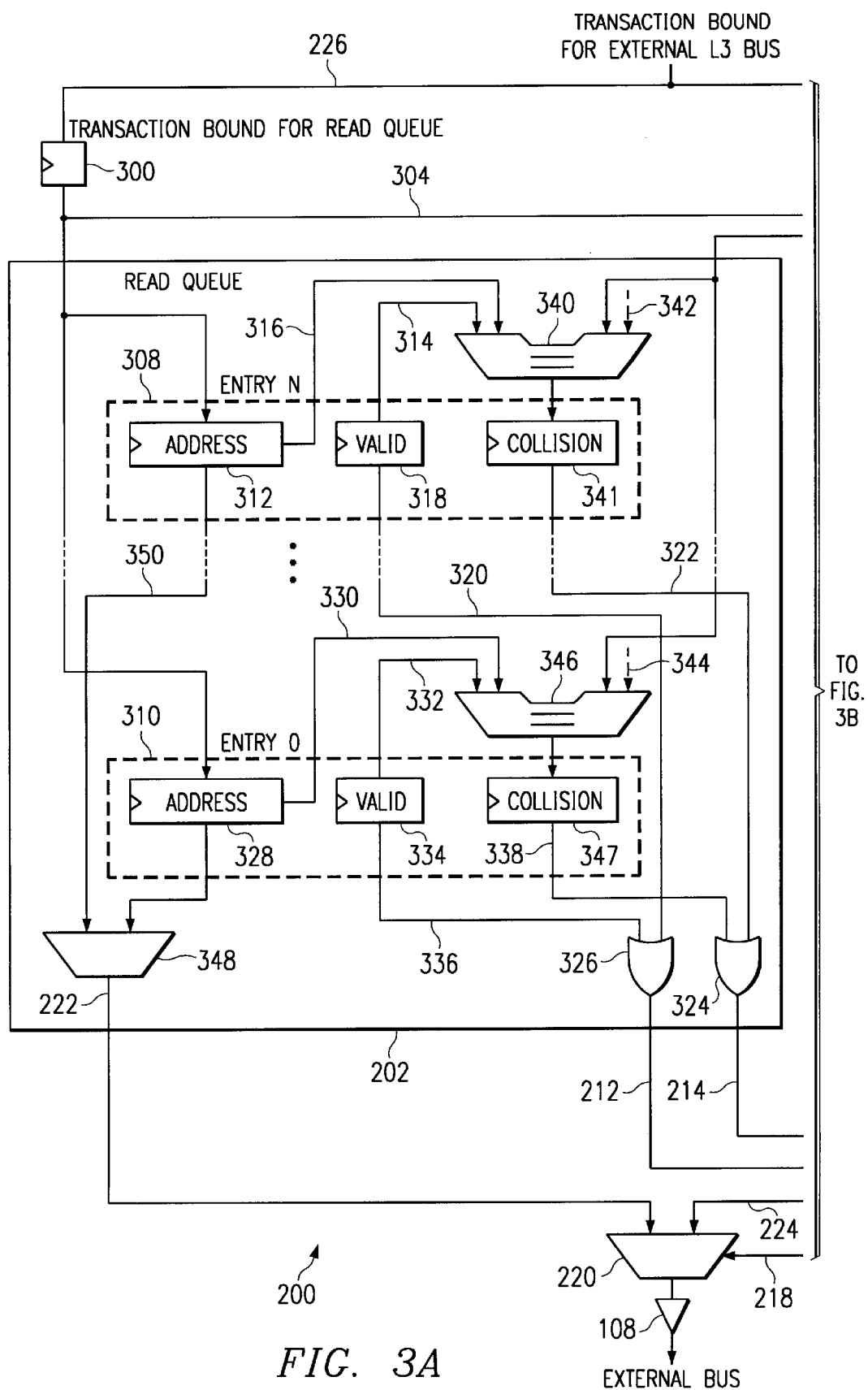
FIGS. 3A–3B are a more detailed block diagram of the queuing for the L3 cache external bus, including the comparison logic in accordance with the disclosed invention.

In the description which follows, like parts are marked throughout the specification and drawings with the same reference numerals, respectively. The drawing figures are not necessarily drawn to scale and certain figures may be shown in exaggerated or generalized form in the interest of clarity and conciseness.

For FIG. 1, a computer system according the disclosed invention is shown. A microprocessor 100 is shown. The microprocessor 100 includes a CPU core 102, an L3 cache tag 104a, and an L3 cache controller 106. The CPU core 102 is connected to the L3 cache controller 106 through internal bus 105. The L3 cache tag 104a is connected to the L3 cache controller 106 through a second internal bus 107. The L3 cache tag 104a, the L3 cache controller 106, and the L3 cache data memory 104b comprise the L3 cache system. The L3 cache data memory 104b is connected to the microprocessor 100, and specifically the L3 cache controller 106, through an external L3 bus 108.

The microprocessor 100 is connected to a system bus 112. A mass storage device 114, a video controller 116, a main memory 110, and an input output device 120 are also connected to bus 112. The video controller 116 is connected to a monitor 118. The mass storage device 114, in the disclosed embodiment, is a hard disk drive. However, a wide variety of mass storage devices can be used without detracting from the spirit of the invention. Other examples of mass storage devices are tape disk drives and compact disk drives. The input output device 120, in the disclosed embodiment, is a keyboard and/or a mouse. The video controller and monitor are common elements of a computer system and are therefore well known in the art.

Referring now to FIG. 2, a diagram of the internal queuing and control of the L3 cache controller 106, according to the disclosed invention is shown. Included within the queuing and control of the cache controller 106 is queuing logic 200. Within queuing logic 200, a series of transactions bound for an external L3 bus 108 are shown. The transactions are routed to a read queue 202 via a read queue bus 226 and a write queue 204 via a write queue bus 228. Along with the read queue 202 and write queue 204, an order buffer 206 is shown. The order buffer 206 in the disclosed embodiment is a FIFO buffer (First In First Out). As the transactions are bound for the external L3 bus 108, they encounter queuing logic 200 and the type of transaction received by the queuing logic is stored in the order buffer 206. The order buffer 206 is a one (1) bit wide buffer designed to accommodate enough entries to identify every transaction stored in the read queue 202 and the write queue 204. Read queue entries in the order buffer are indicated as "1"'s and write queue entries are indicated as "0"'s. The read queue 202 has zero through fifteen entries or sixteen total entries. The write queue 204 has zero through seven entries for a total of eight entries. Therefore, the order buffer 206 has zero through twenty-three entries or twenty-four total one (1) bit wide entries. As the transactions enter the queuing logic 200, the transactions are identified as read or write transactions. If the transaction is a read transaction, then that transaction is stored as the next transaction in the read queue. If the transaction is a write transaction, it is stored in the write queue. When the transactions get loaded in the write and read queues 204 and 202, a corresponding bit is set in the order buffer 206 to record the age of resident transactions. Once the transaction is determined as a read transaction or a write transaction, at substantially the same time, the queuing logic 200 determines if the transaction causes a collision.

A collision is determined by comparing the address of the new transaction with all valid entries in the opposite queue. For example, if a read transaction is bound for the external L3 bus 108, the read transaction will be stored in the read queue 202. However, before storing the read transaction in the read queue 202, the address of the incoming read transaction is compared with all addresses of the resident, valid write transactions stored in the write queue. If the address is matched, then a collision occurs. The queuing logic 200 sets the collision bit(s) within the matching entry/entries in the write queue 204, thus affecting the arbitration logic 216. The queuing logic 200 is discussed in more detail in association with FIG. 3. From the write queue 204, a write queue request signal via line 208 and a write queue collision signal via line 210 are sent to the L3 arbitration logic 216. The oldest entry queue pointer 232 originates in the order buffer 206 indicating which queue contains the oldest, valid resident transaction for the L3 arbitration logic 216. The read queue 202 sends a read queue request signal via line 212 and a read queue collision signal via line 214 to the L3 arbitration logic 216. The transactions in the read and write queues are passed through lines 222 and 224, respectively, to a mux 220. The mux 220 is controlled by line 218 which is an output from the L3 arbitration logic 216. The L3 arbitration logic determines which transaction resident in the queues shall be processed next and sent to the external L3 bus 108. In the disclosed embodiment, if no collision is present, then the read queue 202 has priority. If no collision is present, then the read transaction(s) stored in the read queue 202 are processed before any write transaction(s) stored in the write queue 204 are processed. However, if a collision is present, then the read transaction(s) stored in the read queue 202 and the write transaction(s) stored in the write queue 204 are processed according to the entries in the order buffer 206. Other arbitration mechanisms are possible and may be preferable based upon the specific situation; additionally, a wide range of arbitration mechanisms may be implemented without departing from the scope and spirit of the invention.

Figure 3B:
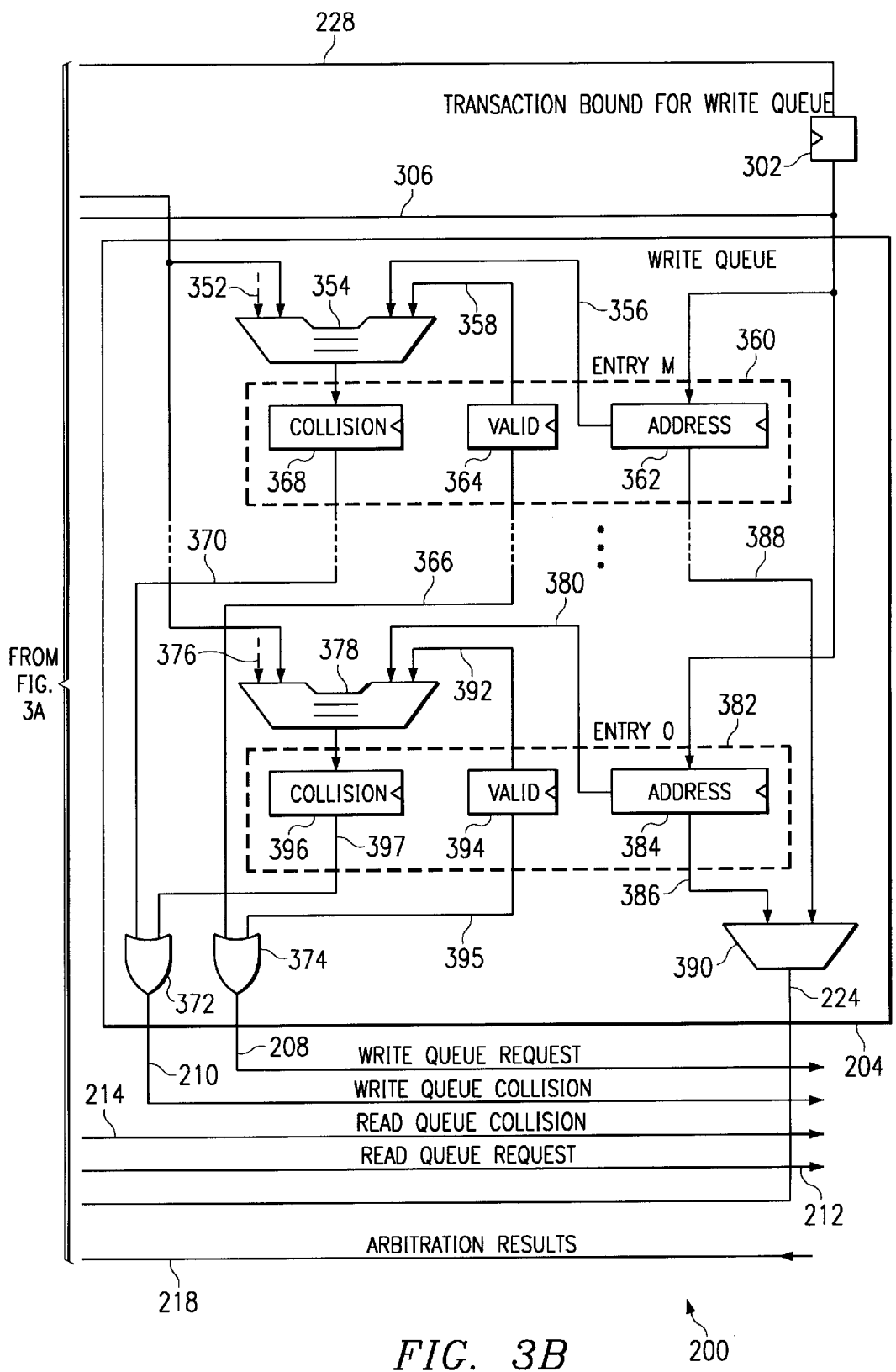

Referring now to FIGS. 3A–3B, a detailed diagram of the queuing logic of the cache controller according to the disclosed invention is shown. Transactions bound for the external L3 bus pass through either the read queue bus 226 or the write queue bus 228. Read transactions are registered in a register 300 before entering the read queue 202. The queuing logic 200 determines whether the address of the transaction in the register 300 is equivalent to an address of a valid, write transaction stored in the write queue 204. The address of the read transaction in the register 300 is transmitted across a bus 304 for comparison with the write queue 204. The write queue 204 is comprised of between zero and seven transactions resident in the write queue 204, these are designated by Entry 0 382 through Entry M 360. Each entry comprises the same structure and will be disclosed for Entries M 360 and Entry 0 382. A comparator 354 is present within the write queue 204. The address of the read transaction in the register 300 is sent to the comparator 354. In order to enable the comparator, the entry valid bit 364 is compared with the one bit wired high 352. The comparator 354 compares the address of the transaction 300 with the address 362 of Entry M 360. The output is registered as a collision indicator 368 for that entry. The collision indicator 368 output is transmitted through a line 370 to an OR gate 372. All collision outputs of the write queue 204 are ORed through OR gate 372. The output of the OR gate 372 is sent as a signal indicating a write queue collision 210. This same process is completed for each and every entry in the write queue 204.

The address for the read transaction in the register 300 is passed through the bus 304 into the comparator 378. Again, one bit (1) 376 of the comparator is tied high to be compared to an entry 0 382 valid bit 394. Entry 0 382 has an address 384. The address 384 is transmitted via a bus 380 into the comparator 378. The valid bit 394 is transmitted through line 392 into the comparator 378. The comparator compares the address of the transaction in the register 300 bound for the read queue 202 and the address 384 of Entry 0 382, along with comparing the entry valid bit, 394, versus a one "1". (bit 376) The output of this comparison is sent to collision bit 396. That output is then transmitted through a line 397 into the OR gate 372. All outputs of all collision bits are transmitted to the OR gate 372 and that output is sent to the arbitration logic 216 indicating a write queue collision 210. All validity components of entries in the write queue 204 are ORed together in OR 374 and that output is transmitted to the arbitration logic 216 indicating a write queue request 208. The resident transaction's address in the write queue 204 are passed on buses 386 and 388 and is transmitted via bus 224 to the mux 220.

If the transaction bound for the external L3 bus is determined to be a write transaction, the transaction is registered in a register 302. The address in the write transaction register 302 is transmitted through bus 306 and is compared with each and every transaction stored in the read queue 202. The read queue 202 has Entry 0 310 through entry N 308 in the disclosed embodiment. The read queue 202 allows for sixteen entries, whereas the write queue allows for eight entries. The address of the write transaction in the register 302 is sent through the bus 306 the comparator 340. Entry N 308 includes an address 312. This address 312 is transmitted through bus 316 to the comparator 340. This address 312 is also sent through bus 350 to mux 348 and then to bus 222 and finally to the mux 220 when Entry N 308 is the oldest entry in the read queue 202. Entry N 308 includes a validity bit 318. The validity bit 318 is sent through a line 314 to the comparator 340. The output of the comparator 340 is determined and sent to a collision bit 341. The output of collision bit 341 is transmitted through line 322 into OR gate 324. The validity 318 is transferred through line 320 into a second OR gate 326. The write transaction address 302 is then compared with each and every entry resident in the read queue 202. For example, the comparison with Entry 0 310 is shown next. The address transmitted through bus 306 is submitted to a comparator 346. In order to enable the comparator 346, an entry valid bit 334 is compared against a "1" 344. Entry 0 310 has an address 328. That address 328 is transmitted through a bus 330 to the comparator 346 to compare against the address transmitted through bus 306. The validity bit 334 is transmitted through a line 332 to the comparator 346. The comparator result provides the input to a collision bit 347. The collision bit 347 is transmitted through a line 338 into the OR gate 324. The OR gate 324 accepts the collision bits of each entry in the read queue 202 and that output is sent to the arbitration logic 216 indicating Read Queue collision. The validity bits 318 and 334 are transmitted through lines 320 and 336 respectively, to an OR gate 326. The output of this OR 326 gate is transmitted to the arbitration logic 216 indicating a read queue request 212.

Figure 4:
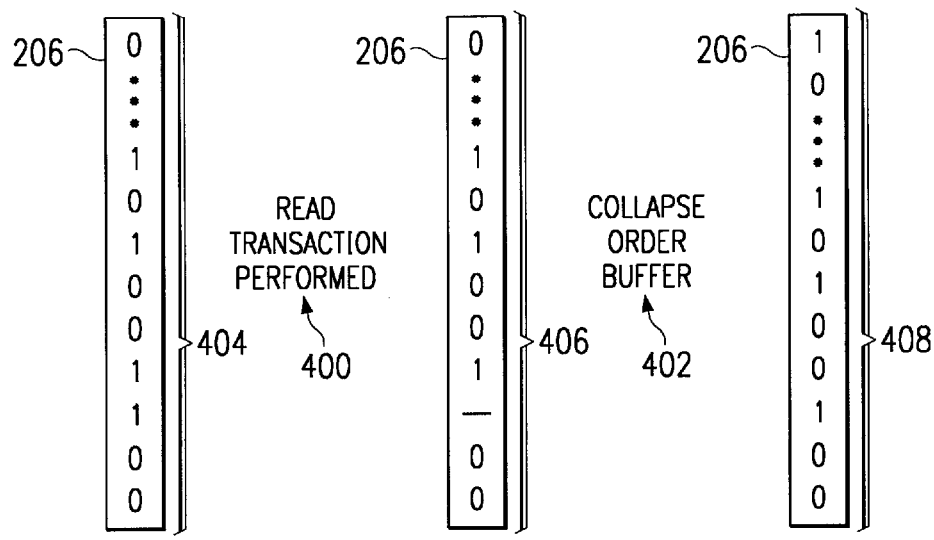
FIG. 4 is a diagram of the order buffer in accordance with the disclosed invention.

Next, referring to FIG. 4, the order buffer process is shown. The order buffer 206 is a buffer which logs the reception of the transaction being submitted to the read queue 202 or the write queue 204. Each read transaction 300 is represented with a high bit or a "1" and each write transaction is represented with a low bit or a "0." The order buffer 206 is designed to accommodate an entry to represent each and every transaction stored in the read queue 202 and the write queue 204. The process of removing the bit representing the transaction being processed by the cache controller 106 is shown. For example, starting at the bottom of column 1 404, the order buffer 206 contains the following digits 001100101 . . . 0. The cache controller 106 processes a read transaction 400. The lowest (also the oldest) "1" in the buffer 206 is then removed from the order buffer 206. This is represented by the middle column 406. The lowest "1" is removed and a dashed line is present in its place. Next, the buffer 206 collapses the remaining entries, allowing for the next transaction occurrence to be placed at the top of the buffer. This is shown as 408. As can be seen, the bottom two "0" indicators remain the same. However, the remaining digits above the first "1" removed have been compressed so there are no empty spaces between the entries. Thus, as each transaction is processed, the lowest occurrence of the specific transaction type, where a read transaction is a "1" or a write transaction is a "0" is removed and the remaining digits in the order buffer are collapsed.

Figure 5:
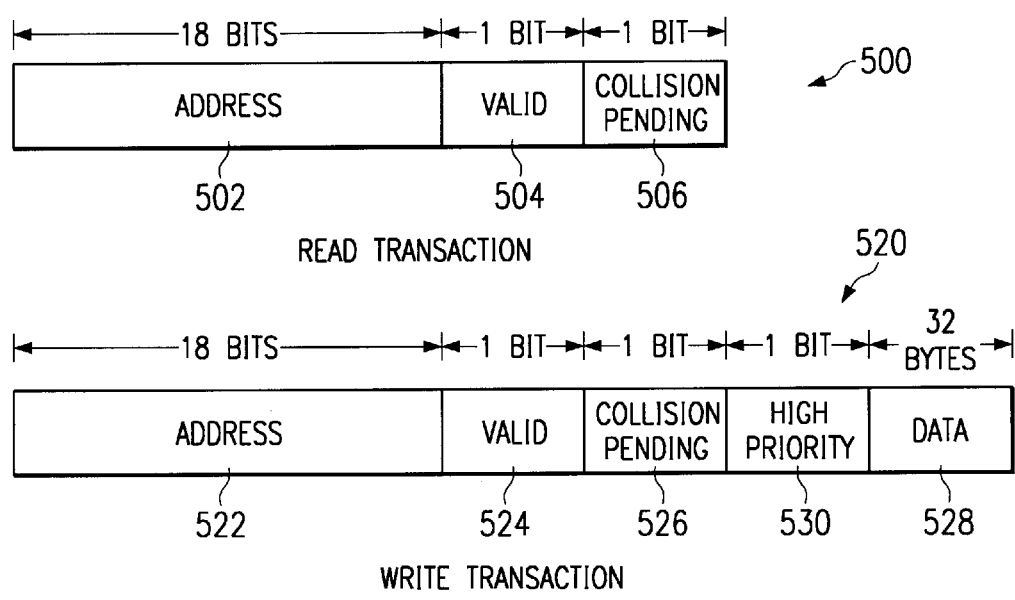
FIG. 5 is a diagram showing the bit definition of a queue entry of a read and write transaction.

Referring now to FIG. 5, the signal description of a read and write queue entry according to the disclosed invention is shown. A read transaction 500 is shown. The read transaction 500 includes an address field 502, a validity bit 504, and a collision pending bit 506. The address field 502 is 18 bits wide. The read transaction 500 therefore is 20 bits wide. The write transaction 520 is comprised of an address field 522, a valid bit 524, a collision pending bit 526, a high priority bit 530, and data field 528. The address 522 is also 18 bits wide. The data field 528 associated with this write transaction 520 is 32 bytes wide.

Figure 6:
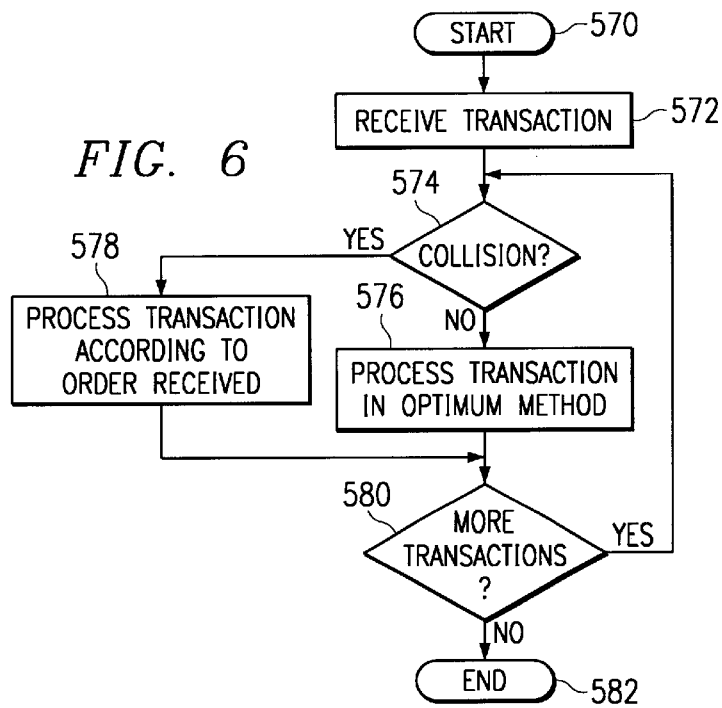
FIG. 6 is a flowchart of the arbitration between the queues in accordance with the disclosed invention.

Referring now to FIG. 6, a flowchart of the arbitration process according to the disclosed invention is shown. The process starts with step 570. In step 572, a transaction is received. Whether the transaction collides with another transaction is determined in step 574. If no collision is determined, then in step 576, the queued transaction(s) are processed in the most optimal method. If there is a collision, then the queued transaction(s) are processed according to the order received as stored in the order buffer 206 in step 578. After a transaction has been processed, it is determined if more transactions are present in step 580. If more transactions are present, then the process returns with determining whether a collision condition still exists in step 574. If no transactions are present, then the process ends at 582. In the disclosed embodiment, this process is implemented through the read and write transactions of a cache controller 106. However, a wide variety of hardware systems can use the disclosed invention without detracting from the spirit of the invention.

Figure 7:
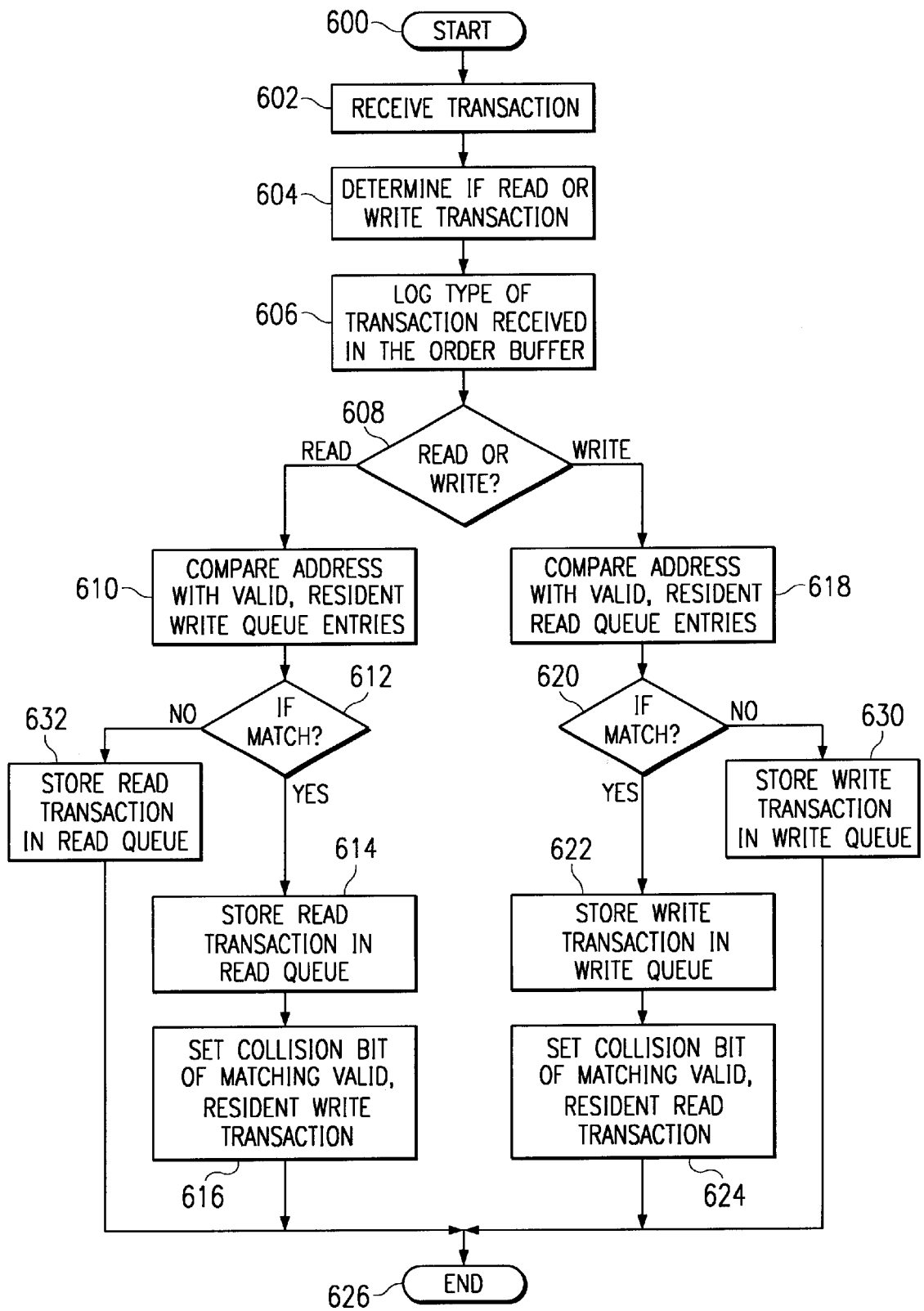
FIG. 7 is a flowchart of the loading of the queue entries in accordance with the disclosed invention.

Next in FIG. 7, the loading of the queue entries process, according to the disclosed invention, is shown. The process begins with Start in step 600. A transaction is received in step 602. Next, in step 604, whether the transaction is a read or write transaction is determined. In step 606, the type of transaction received is logged in the order buffer. If the transaction is a read transaction, as determined in step 608, the address of the read transaction is compared with all valid, resident write queue entry addresses in step 610. If there is no match of addresses in step 612, then the read transaction is stored in the read queue in step 632 before proceeding to End in step 626. However, if there is a match of the addresses in step 612, then the read transaction is stored in the read queue in step 614 and the collision bit of the matching valid, resident write transaction is set to mark that it is in collision with a transaction in the read queue in step 616. Then the process ends at step 626.

If the transaction is determined to be a write transaction in step 608, then the address of the write transaction is compared with the addresses of all valid, resident read queue entries in step 618. If there is a match in step 620, the write transaction is stored in the write queue in step 622 and the collision bit of the matching valid, resident read transaction is set to indicate that a collision is occurring in step 624. This process then ends at step 626. If there is no match in step 620, then the write transaction is stored in the write queue in step 630 and the process ends with step 626.

Figure 8:
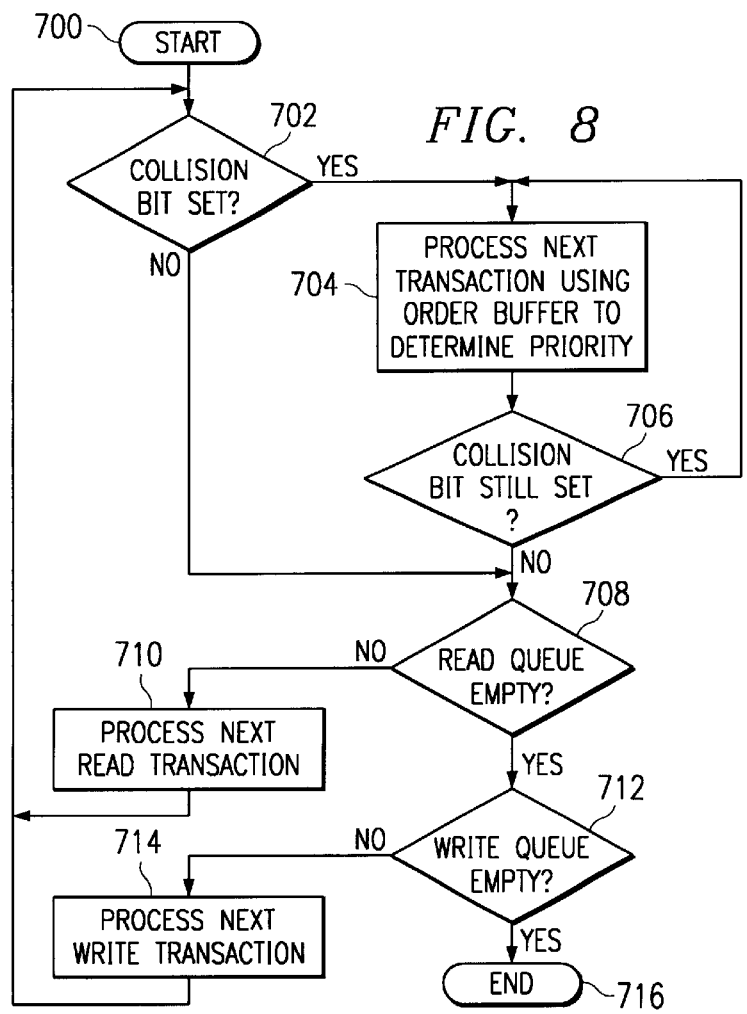
FIG. 8 is a flowchart of the arbitration process in accordance with the disclosed invention.

Referring now to FIG. 8, a flowchart of the arbitration process according to the disclosed invention is shown. The process starts with step 700, Start. Next, in step 702, whether a collision is present is determined. If there is a collision, the processing of the next transaction is performed using the order buffer to determine priority in step 704. After the transaction is processed based upon the order buffer determining priority, whether a collision is still pending is determined in step 706. If a collision is still pending, then the process returns to step 704 and the next transaction is processed using the order buffer to determine priority. If a collision is no longer pending, then the process continues with step 708. However, if the collision bit was not set in step 702, then the process continues with step 708. Step 708 determines whether the read queue is empty. If the read queue is not empty, the next read transaction is processed in step 710 before returning to step 702 to determine if there is a pending collision. If the read queue is empty, then the process continues with step 712. If the write queue is empty, as determined by step 712, then the process ends at process 716. However, if the write queue is not empty, then the next write transaction is processed in step 714 before the process returns to step 702. Then whether a collision bit is set is determined before processing of the next transaction.

This process allows for all read transactions in the read queue to be processed before any transactions in the write queue if no collision is pending. Once a collision is present, then the read queue 202 and write queue 204 are processed according to the entries in the order buffer 206 indicating the order that the resident, valid entries were loaded. However, once the entry containing the collision in the read or write queue has been processed, the collision bit is reset and the prioritization based upon processing read transactions first over the write transactions is resumed. However, any optimization scheme other than processing the read transactions over the write transactions may be used according to the disclosed invention. "The optimal method for processing in response to detecting no collision may alternatively include, i) performing write operations preferentially to read operations if the last operation was a write operation, and read operations preferentially to write operations if the last operation was a read operation; ii) preferentially performing those memory access operations which access a page of memory corresponding to the last page accessed; iii) performing write operations before read operations; or iv) performing read and write operations in a round robin sequence." The disclosed invention allows for data coherency to be maintained when a collision is pending by implementing the order buffer as disclosed herein. However, any optimization scheme can be used when there is no collision pending. The read first optimization scheme disclosed herein is one embodiment; however, a wide variety of optimization schemes can be available without detracting from the spirit of the invention.

The foregoing disclosure and description of the invention are illustrative and explanatory thereof and various size, shape, materials, and components may be made without departing from the spirit of the invention.

What is claimed is:

1. A computer system for prioritizing transactions comprising:
   a processor;
   a memory coupled to the processor, the memory including
      a first type transaction queue, and a second type transaction queue;
   memory controller logic, perfoming the steps of:
      receiving a transaction;
      determining if the transaction is a first type transaction or a second type transaction;
      if the transaction is the first type transaction, comparing the transaction with all second type transactions stored in the second type transaction queue;
      if the transaction is the second type transaction, comparing the transaction with all first type transactions stored in the first type transaction queue;
      if no first type transaction matches a second type transaction, processing the transactions in an optimal method; and
      if a first type transaction matches a second type transaction, processing the transactions in the order that the transactions are received.

2. The computer system of claim 1 wherein the optimal method comprises processing all of the faster of the first and second type transactions first and then processing all of the slower of the first and second type transactions second.

3. An apparatus for prioritizing read transactions and write transactions within a memory comprising:
   a processor;
   a cache coupled to the processor, the cache comprising an operably connected read transaction queue, write transaction queue, order buffer, and prioritizing logic;
   the prioritizing logic performing the steps of:
      receiving one or more transactions;
      logging the occurrence of each transaction in the order buffer;
      if the received transaction is a read transaction, comparing the address of the received read transaction with the addresses of all write transactions in the write transaction queue;
      if the address of the read transaction matches the address of a write transaction stored in the write transaction queue, storing the received read transaction in the read transaction queue and identifying the address matching the write transaction as a collision in the write transaction queue;
      if the received transaction is a write transaction, comparing the address of the received write transaction with the addresses of all read transactions in a read transaction queue;
      if the address of the write transaction matches the address of a read transaction in the read transaction queue, storing the write transaction in the write transaction queue and identifying the address matching read transaction as a collision in the read transaction queue;
      reviewing each transaction queue for collisions;
      if a collision is present in either transaction queue, processing the transactions according to the order recorded in the order buffer until the transaction marked as a collision is processed; and
      if no collision transaction is present in either transaction queue, processing the read transactions present in the read transaction queue prior to processing the write transactions in the write transaction queue.

4. The apparatus of claim 3, wherein the step of identifying the address matching read transactions includes setting a collision attribute bit in the read transaction queue and the step of identifying the address matching write transactions includes setting a collision attribute bit in the write transaction queue.

5. The apparatus of claim 3, wherein the cache is a level three (L3) cache.

6. The apparatus of claim 3, wherein the prioritization logic further comprises the steps of:
   if the read transaction queue is empty, processing the write transactions present in the write transaction queue.

7. A method of prioritizing transactions in a computer system including a microprocessor comprising the steps of:
   providing a cache memory system operably connected to the microprocessor including:
      a first type transaction queue in which a first type of transaction is stored,
      a second type transaction queue in which a second type of transaction is stored, and
      and occurrence buffer in which the order of the first and second type of transactions are stored;
   receiving a transaction in the cache memory system;
   storing the receipt of the transaction in the occurrence buffer;
   determining if the transaction is a first type transaction or a second type transaction;
   if the transaction is the first type transaction, comparing the transaction with all second type transactions stored in the second type transactions queue;
   if the transaction is the second type transaction, comparing the transaction with all first type transactions stored in the first type transaction queue;
   if neither comparison provides a match, then processing the transactions in an optimal method; and
   if either comparison provides a match, then processing the transactions in the order stored in the occurrence buffer.

8. The method of claim 7, wherein each transaction includes an address and the step of comparing the first type transaction with all second type transactions includes comparing the address of the first type transaction with all the addresses of the second type transactions.

9. The method of claim 7, wherein each transaction includes an address and the step of comparing the second type transaction with all first type transactions includes comparing the address of the second type transaction with all the addresses of the first type transactions.

10. The method of claim 7, wherein the step of processing the transactions in an optimal method includes processing the all of one type transactions prior to the processing any of the other type transactions.

11. The method of claim 7, wherein the step of determining if the transactions are a first type transaction or a second type transaction includes determining if the transactions are a read transaction or a write transaction.

12. The method of claim 7 further comprising the steps of:
removing the stored occurrence from the occurrence buffer upon the processing of the read transaction;
removing the stored occurrence from the occurrence buffer upon the processing of the write transaction; and
collapsing the remaining stored occurrences in the occurrence buffer.

13. A method of prioritizing data transactions in a computer system having a processor, an order buffer, a write queue, a read queue, the method comprising the steps of:
intercepting a transaction from the processor;
determining if the transaction is a read transaction or a write transaction;
logging the occurrence of the transaction in the order buffer;
if the received transaction is a read transaction, comparing at least a portion of the read transaction with at least a portion of all write transactions in the write queue;
if the portion of the received read transaction matches the portion of a write transaction in the write queue, storing the received read transaction in the read queue and identifying the matching write transaction as a collision;
if the received transaction is a write transaction, comparing at least a portion of the write transaction with the at least a portion of all read transactions in a read queue;
if the portion of the received write transaction matches the portion of a read transaction in the read queue, storing the write transaction in the write queue and identifying the matching read transaction as a collision;
if a collision is present in either the read queue or the write queue, processing the transactions in accordance with the order the transactions were entered in the order buffer until the transaction marked as a collision is processed; and
if no collision transaction is present in either the read queue or the write queue, processing the read transactions present in the read queue prior to processing the write transactions in the write queue.

14. The method of claim 13 further comprising the steps of:
removing the stored occurrence from the order buffer upon the processing of the read transaction;
removing the stored occurrence from the order buffer upon the processing of the write transaction; and
collapsing the remaining stored occurrences in the order buffer.

\* \* \* \* \*